United States Patent

Tanaka

(10) Patent No.: US 6,727,966 B2
(45) Date of Patent: Apr. 27, 2004

(54) REFLECTION TYPE COLOR LIQUID CRYSTAL DISPLAY DEVICE

(75) Inventor: Tomio Tanaka, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 74 days.

(21) Appl. No.: 10/127,316

(22) Filed: Apr. 22, 2002

(65) Prior Publication Data

US 2002/0186335 A1 Dec. 12, 2002

(30) Foreign Application Priority Data

Apr. 27, 2001 (JP) ......................... 2001-131388
Jan. 15, 2002 (JP) ......................... 2002-006544

(51) Int. Cl.[7] ........................................... G02F 1/1335
(52) U.S. Cl. ........................................ 349/114; 349/113
(58) Field of Search ........................ 349/106, 113–114

(56) References Cited

U.S. PATENT DOCUMENTS 5,059,000 A * 10/1991 Kaneko et al. ............ 349/20
5,140,447 A * 8/1992 Kaneko et al. ............ 349/20
5,921,650 A * 7/1999 Doany et al. ............. 353/31

* cited by examiner

Primary Examiner—Dung Nguyen
(74) Attorney, Agent, or Firm—Timothy J. Keefer; Wildman, Harrold, Allen & Harrold, LLP

(57) ABSTRACT

A reflection type color liquid crystal display device including a liquid crystal cell to be controlled by a field sequential system and a reflection device disposed on the back side of the liquid crystal cell. In the reflection device, is a belt-like reflection sheet having reflection regions for reflecting lights of three colors R, G and B formed thereon. The reflection sheet is driven by a driver. A semi-transparent and semi-reflection type color liquid crystal display device includes a liquid crystal cell and a semi-transparent and semi-reflection device disposed on the back side of the liquid crystal cell. In the semi-transparent and semi-reflection device is a belt-like semi-transparent and semi-reflection film and a light source therein. The semi-transparent and semi-reflection film is driven by a driver.

13 Claims, 11 Drawing Sheets

19R, 19G, 19B  COLORED LAYER 36R, 36G, 36B  REFLECTING REGION

Ta  EMITTED LIGHT
Ra  INCIDENT LIGHT (OUTSIDE LIGHT)
Tb  TRANSPARENT COLORED LIGHT
Rb  REFLECTION COLORED LIGHT

REFLECTION TYPE COLOR LIQUID CRYSTAL DISPLAY DEVICE

BACKGROUND OF THE INVENTION

1. Field of the Invention

The present invention relates to a reflection type color liquid crystal display device and a semi-transparent and semi-reflection type color liquid crystal display device of a field sequential system.

2. Description of the Related Art

In recent years, there has been proposed a color liquid crystal display device using a field sequential system with the advantages of energy saving, low cost and an improvement in resolution.

The principle of the color liquid crystal display by the field sequential system is as follows: a liquid crystal display (hereinafter abbreviated as "an LCD") is used as a light shutter, followed by irradiation with light emitted from a light source sequentially lighted behind the LCD, thereby switching the light color of the light source at a high speed.

However, the above-described color liquid crystal display device of the field sequentially lighted behind the LDC, as described above, and therefore, consumption of electric power by the light source is heavy, with an attendant problem that the above-described color liquid crystal display device is inappropriate to a liquid crystal display device for portable electronic equipment which is driven by a battery.

SUMMARY OF THE INVENTION

The present invention addresses the above-described problem experienced by the prior art. An object of the present invention is to provide a reflection type color liquid crystal display device f reduced power consumption, and a semi-transparent and semi-reflection type color liquid crystal display device capable of clearly and brightly displaying a screen with reduced power consumption even in the field sequential system.

A reflection type color liquid crystal display device of a field sequential system can be configured by incorporating a reflection sheet having respective reflecting regions for colors on the back side of an LCD, and then, by moving the reflection sheet in synchronism with switching of a contrast pattern corresponding to the displaying of each color of the LCD.

The above-described object is achieved by a reflection type color liquid crystal display device according to the present invention comprising: a liquid crystal cell of a field sequential system, in which light transmittances are sequentially controlled per pixel in such a manner as to correspond to the number of two or more colors at one frame on a screen to be displayed; and a reflection device disposed at a position at which light passing through the liquid crystal cell is incident, wherein the reflection device includes: a reflection sheet provided with two or more reflecting regions colored in color corresponding to that of the frame; and a driver for driving the reflection sheet in such a manner as to sequentially move the two or more reflecting regions to a position at which the incident light is selectively reflected toward the liquid crystal cell in synchronism with the control of the order of colors in the pixel in the liquid crystal cell.

Furthermore, a semi-transparent and semi-reflection type color liquid crystal display device of a field sequential system can be configured by incorporating a semi-transparent and semi-reflection film having respective transparent and reflecting regions for colors on the back side of an LCD, followed by irradiation with light from the back side of the LCD, and then, by moving the film in synchronism with the switching of a contrast pattern corresponding to displaying of each color of the LCD.

The above-described object is achieved by a semi-transparent and semi-reflection type color liquid crystal display device according to the present invention comprising: a liquid crystal cell of a field sequential system, in which light transmittances are sequentially controlled per pixel in such a manner as to correspond to the number of two or more colors at one frame on a screen to be displayed; and a semi-transparent and semi-reflection device disposed at a position at which outside light passing through the liquid crystal cell is incident, wherein the semi-transparent and semi-reflection device includes: a semi-transparent and semi-reflection film including two or more color regions colored in color corresponding to the display color of the frame, the color region being provided with a transparent region and a reflecting region; a light source located at a position at which the liquid crystal cell is irradiated with light from the back side while holding the semi-transparent and semi-reflection film between the liquid crystal cell and the same; and a driver for driving the semi-transparent and semi-reflection film in such a manner as to sequentially move to a position at which the two or more color regions allow the light emitted from the light source to selectively pass in the direction of the liquid crystal cell and the outside light is reflected toward the liquid crystal cell in synchronism with the control of the order of colors in the pixel in the liquid crystal cell.

DESCRIPTION OF THE PREFERRED EMBODIMENTS

Preferred embodiments according to the present invention will be described below in reference to the accompanying drawings.

First to Third Embodiments:
Reflection Type Color Liquid Crystal Display Device

Figure 1:
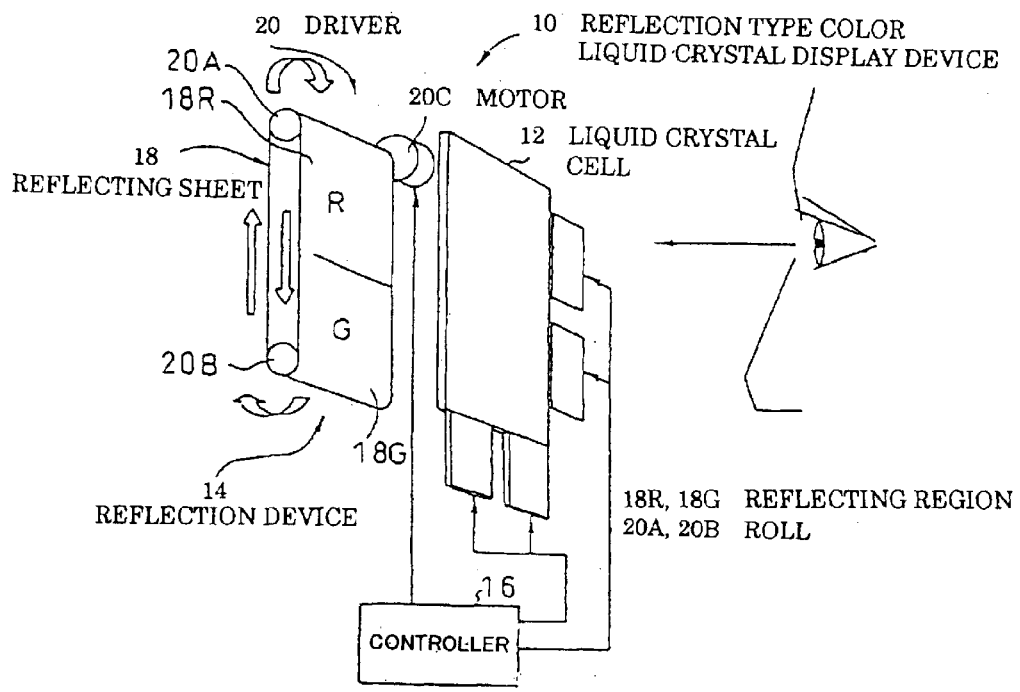
FIG. 1 is a schematically exploded perspective view showing a reflection type color liquid crystal display device in a first preferred embodiment according to the present invention.

As illustrated in FIG. 1, a reflection type color liquid crystal display device 10 in a first preferred embodiment comprises a liquid crystal cell 12 of a field sequential system in which light transmittances are sequentially controlled in such a manner as to correspond to three colors, i.e., R (red), G (green) and B (blue) at one frame on a screen to be displayed at one and the same pixel, and a reflection device 14 disposed on the back side of the liquid crystal cell 12 in such a manner as to allow light passing through the liquid crystal cell 12 to be incident thereinto.

The liquid crystal cell 12 is adapted to perform color displaying in a field sequential (sequential pixel displaying) system, that is, perform color displaying in a method for mixing colors in time sequence by a controller 16.

Specifically, R, G and B are divided into three fields (i.e., images), which are switched in sequence at a high speed, to be thus synthesized into one color image.

Consequently, although only an image of a single color is displayed at an instant time, the colors are mixed together by the effect of a phenomenon of the persistence of vision in the retina if a field repeating speed is enough high not to recognize a flicker, so that the color image can be recognized.

Light of a single color R, G or B incident from the back side of the liquid crystal cell 12 is formed by the reflection device 14, and then, the respective lights of the colors are reflected and formed in sequence in accordance with a switching timing by the liquid crystal cell 12 as a light shutter.

Figure 2:
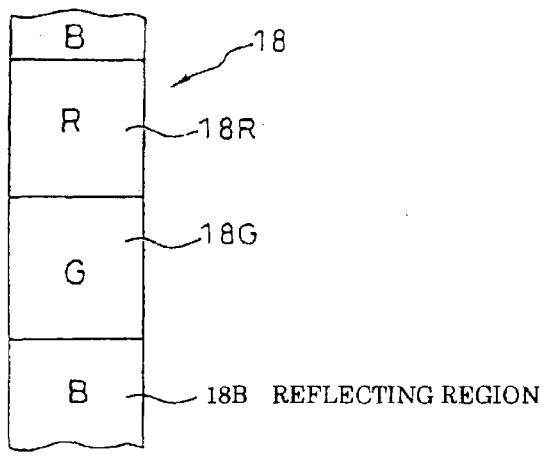
FIG. 2 is an exploded view showing a reflection sheet in the reflection type color liquid crystal display device.

That is to say, the reflection device 14 includes an endless belt-like reflection sheet 18 (see FIG. 2) divided in coating into three reflecting regions 18R, 18G and 18B in such a manner as to form reflected light of each of the three colors R, G and B, and a driver 20 consisting of a pair of rolls 20A and 20B for winding up and driving the reflection sheet 18 and a motor 20C for driving at least one of the rolls.

The motor 20C is controlled by the controller 16 within the range of the field switching speed of the liquid crystal cell 12 in such a manner that the reflecting regions 18R, 18G and 18B are sequentially positioned on the back side of the liquid crystal cell 12. Field switching in the liquid crystal cell 12 is controlled in synchronism with the switching speed of the reflecting regions 18R, 18G and 18B.

Figure 3:
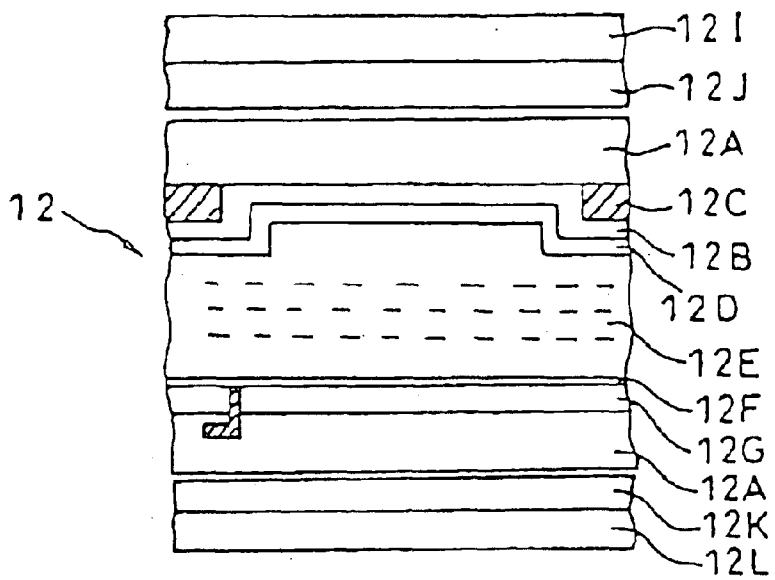
FIG. 3 is an enlarged cross-sectional view showing one pixel in a liquid crystal cell in the reflection type color liquid crystal display device.

As illustrated partly in enlargement in FIG. 3, the liquid crystal cell 12 is constituted of a transparent substrate 12A on a display side, a transparent common electrode 12B, a black matrix 12C sandwiched between the outer periphery of each of pixels on the transparent common electrode and the transparent substrate 12A on the display side, an orientation film 12D, a liquid crystal layer 12E, another orientation film 12F on an opposite side, for holding the liquid crystal layer 12E between the orientation film 12D and the same, a pixel electrode 12G for supporting the orientation film 12F, a TFT array substrate 12H for supporting the pixel electrode 12G, polarizing plates 12I and 12L and optically compensated films 12K and 12J, in order from an observation side.

Incidentally, the liquid crystal cell 12 is not restricted to the arrangement illustrated in FIG. 3, and may be constituted of other elements by a well-known technique. However, the liquid crystal cell 12 is different from that in a color liquid crystal display in the prior art in that there is no color filter for each color and each of the pixels displays a plurality of colors.

Figure 4:
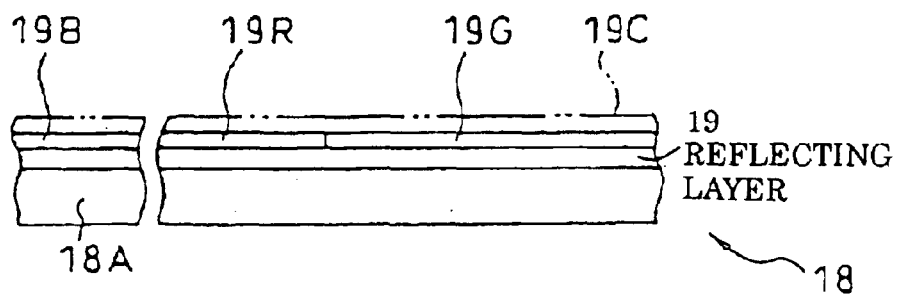
FIG. 4 is a partly enlarged cross-sectional view showing the reflection sheet in the reflection type color liquid crystal display device.

In the reflection sheet 18 in the reflection device 14, a reflecting layer 19 and the reflecting regions 18R, 18G and 18B composed of colored layers 19R, 19G and 19B, respectively, are formed on a base 18A made of a resin film, a metallic film or the like, as illustrated in FIG. 4. As the base 18A is used a metal thin plate made of aluminum, steel or the like, and a plastic film such as a polyethylene terephtharate (PET) film, a polyester film, a polycarbonate film, a polyacryl film or a polyolefin film. The thickness of the base 18A is not limited in particular, but it should be preferably from 10 $\mu$m to 5 mm.

If the thickness of the base 18A is equal to or less than 10 $\mu$m, the base 18A is poor in scuff-resistance during continuous rotation (movement); in contrast, if it is equal to or more than 5 mm, the rigidity becomes excessive, thereby preventing smooth rotation.

The reflecting layer 19 formed on the base 18A is formed by physical vapor deposition (abbreviated as PVD) with metal having a high reflectance such as aluminum or silver. The PVD is appropriately selected from ordinary methods for forming a metal thin film, such as vacuum deposition, sputtering and ion plating. Furthermore, the reflecting layer 19 may be formed in a plurality of layers. Here, a satisfactory reflectance can be achieved if the thickness of the reflecting layer 19 ranges from about 50 nm to about 100 nm.

As illustrated in FIG. 4, the colored layers 19R, 19G and 19B are formed on the reflecting layer 19, so as to reflect lights of predetermined colors. A specific coloring method is the same as that for a color filter in the prior art, that is, it is a dying method or a dispersing method.

In the case where the above-described light reflecting layer is formed by the PVD such as the deposition method, a protective layer 19C consisting of a coating film made of, for example, an acrylic resin, an epoxy resin, a polyester resin, an urethane resin or an alkyd resin should be preferably formed on the reflecting layer 19 and the colored layers 19R, 19G and 19B in order to prevent any degradation of the reflecting layer, as indicated by a chain double-dashed line in FIG. 4. Such coating should be desirably roll coating, gravure coating or spray coating. Furthermore, a thin film made of inorganic substance such as silicon oxide may be used as the protective layer.

Liquid crystal for use in the liquid crystal layer 12E in the liquid crystal cell 12 should be preferably a high-response liquid crystal such as an optically compensated birefringence (OCB) liquid crystal or a ferroelectric liquid crystal since the response of the liquid crystal need be set to 2 ms to 3 ms or shorter and a high-speed switch transistor made of polysilicon or the like should be desirably used as the TFT, as described later.

Since a field period need be set to 17 ms (1/60 sec.) or shorter so as to prevent any flicker on a screen in the case of the field sequential displaying, the displaying period of each of the reflecting regions 18R, 18G and 18B need be set to 6 ms or shorter.

Incidentally, the moving speed of each of the reflecting regions 18R, 18G and 18B is proportional to the size of the entire screen in the liquid crystal cell 12 and is inversely proportional to the length in the moving direction of each of the reflecting regions 18R, 18G and 18B.

The moving direction of each of the reflecting regions 18R, 18G and 18B in the reflecting sheet 18 can be any one of vertical, lateral and slantwise directions with respect to the liquid crystal cell (i.e., the screen).

In the reflection type color liquid crystal display device 10 in the above-described preferred embodiment, the liquid crystal cell 12 is controlled by the controller 16 in such a manner as to display a desired color when the pixel is positioned in front of any of the reflecting regions 18R, 18G and 18B in synchronism with the rotation of the reflecting regions 18R, 18G and 18B in the reflecting sheet 18 in the reflection device 14 at a predetermined speed in a fixed direction by the driver 20.

Therefore, the reflecting regions 18R, 18G and 18B are moved in sequence at an interval of 17 ms or shorter, as described above, and accordingly, R, G and B are controlled in sequence to be displayed on the liquid crystal cell 12, so that the light incident through the surface of the liquid crystal cell 12 is reflected on any of the reflecting regions 18R, 18G and 18B after passing through the liquid crystal cell 12, to be thus turned into a colored light, which then passes through the liquid crystal cell 12 again, thereby displaying the colors in sequence.

On the side of an observer, the lights of the colors R, G and B at one and the same pixel during a field period of 1/60 sec. or shorter are displayed in sequence, so that the colors are timewise mixed together by the effect of the phenomenon of the persistence of vision in the retina, and consequently, the color image can be recognized.

In particular, since there is no need of a backlight source or the like for forming light of a single color in the reflection type color liquid crystal display device 10 in this preferred embodiment, electric power consumption can be reduced, and consequently, is suitably used in portable electronic equipment or the like which is driven by a battery.

Figure 5:
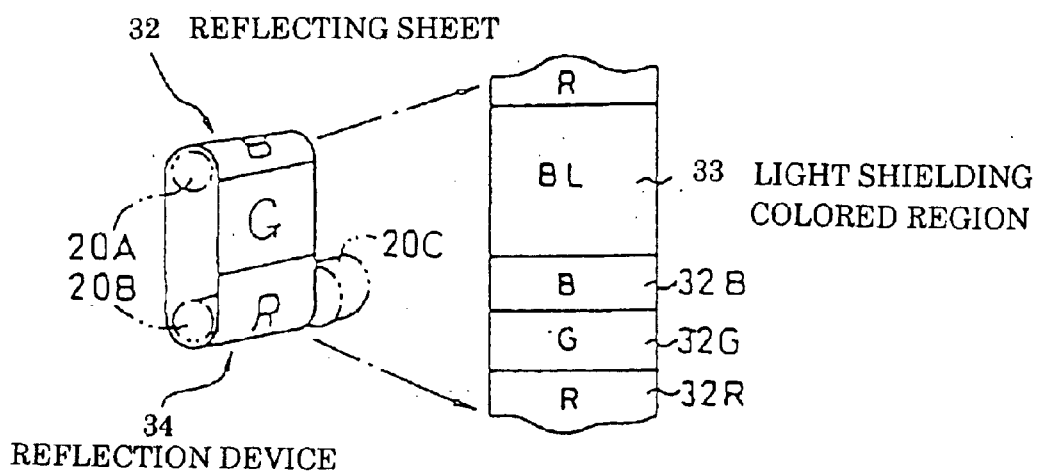
FIG. 5 is a perspective view, inclusive of an exploded view, showing a reflection sheet in a reflection type color liquid crystal display device in a second preferred embodiment according to the present invention.

Next, explanation will be made on a reflection type color liquid crystal display device 30 in a second preferred embodiment according to the present invention, as illustrated in FIG. 5.

This reflection type color liquid crystal display device (the entire configuration of which will be omitted in the illustration) comprises a liquid crystal cell 12, not shown, which is the same as that in the reflection type color liquid crystal display device 10 illustrated in FIG. 1, and a reflection device 34 including a reflecting sheet 32 having reflecting regions different from those illustrated in FIG. 1.

In the reflecting sheet 32, there is provided a light shielding colored region 33 in addition to reflecting regions 32R, 32G and 32B of three colors R, G and B which are the same as the above-described reflecting regions 18R, 18G and 18B.

The light shielding colored region 33 is colored in, for example, black, and the length of the reflecting sheet 32 in the moving direction is set to about 50% to 100% of the length of the reflecting regions 32R, 32G and 32B.

In the meantime, the displaying is performed in black in the liquid crystal cell 12 by a controller 16, regarding a period corresponding to the light shielding colored region 33 as a blanking period.

Figure 6:
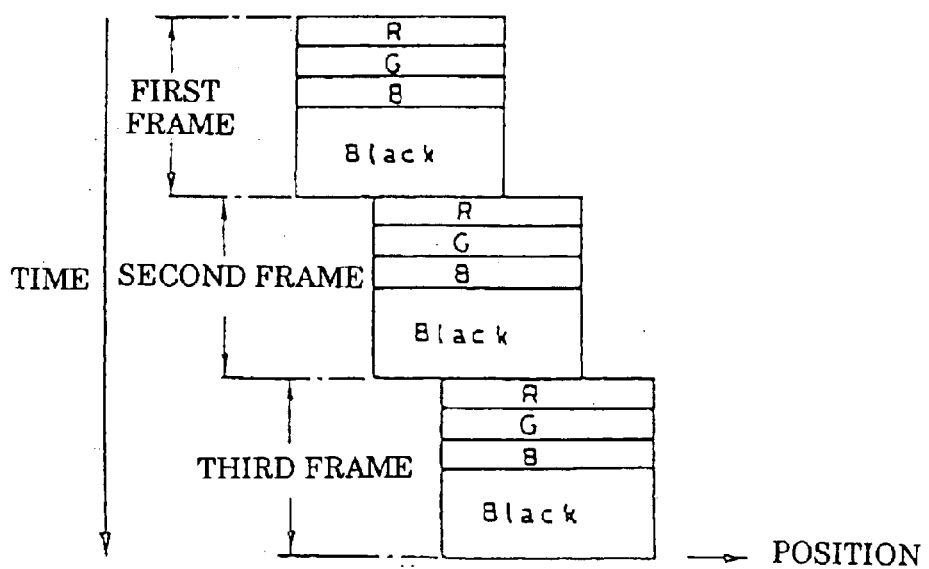
FIG. 6 is a schematic view illustrating the state of color displaying in the reflection type color liquid crystal display device based on the relationship between a horizontal position on a screen and a time axial direction.

In this manner, the reflecting regions 32R, 32G and 32B and the light shielding colored region 33 in this order are sequentially rotated and moved in the reflecting sheet 32 in this reflection type color liquid crystal display device, so that the displaying in black is always performed after the displaying in the three colors, that is, in the sequence of R, G, B, Black, R, G, B and Black in a first frame, a second frame and a third frame in displaying a moving image which moves, for example, rightward in FIG. 6, as schematically illustrated in FIG. 6.

Figure 7:
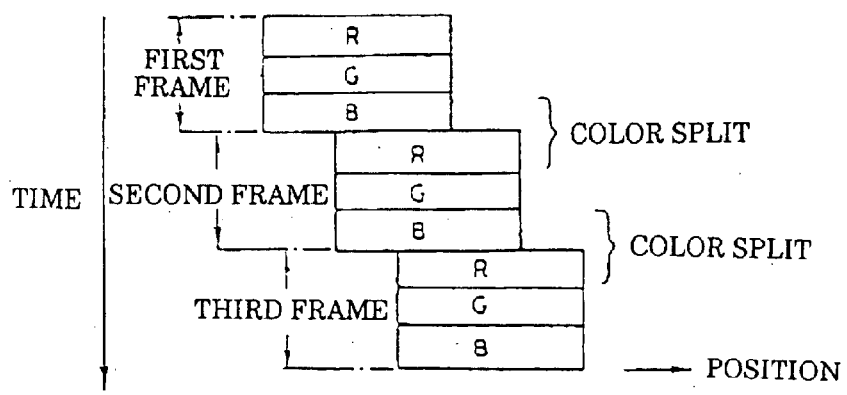
FIG. 7 is a schematic view, similar to FIG. 6, in the case where there is no light shielding colored region in the reflection sheet.

This can prevent a so-called color breakup. That is to say, in the case where there is provided no light shielding colored region 33, and further, where there is no blanking period for the displaying in black on the side of the liquid crystal cell 12, the last color B in each of the frames and the first color R of a next frame are mixed by the effect of the phenomenon of the persistence of vision in the retina of an observer when a moving image is displayed in the same manner as described above, thereby inducing occurrence of a so-called color breakup, as illustrated in FIG. 7. However, in this reflection type color liquid crystal display device in the present preferred embodiment, the light shielding colored region 33 is displayed in black after the regions 32B, 32G and 32R are displayed in the three colors R, G and B, thus preventing any occurrence of the color breakup.

Here, the ratio of the length of the light shielding colored region 33 to the length of the reflecting regions 32R, 32G and 32B in the moving direction should be preferably from ½ to 1. The reason for this is that if the length of the light shielding colored region 33 exceeds ½ of the entire length of the reflecting sheet 32, a light source utilizing rate becomes unfavorably half or less; in contrast, if it is equal to or less than ¼ of the entire length, the above-described color breakup occurs.

Figure 8:
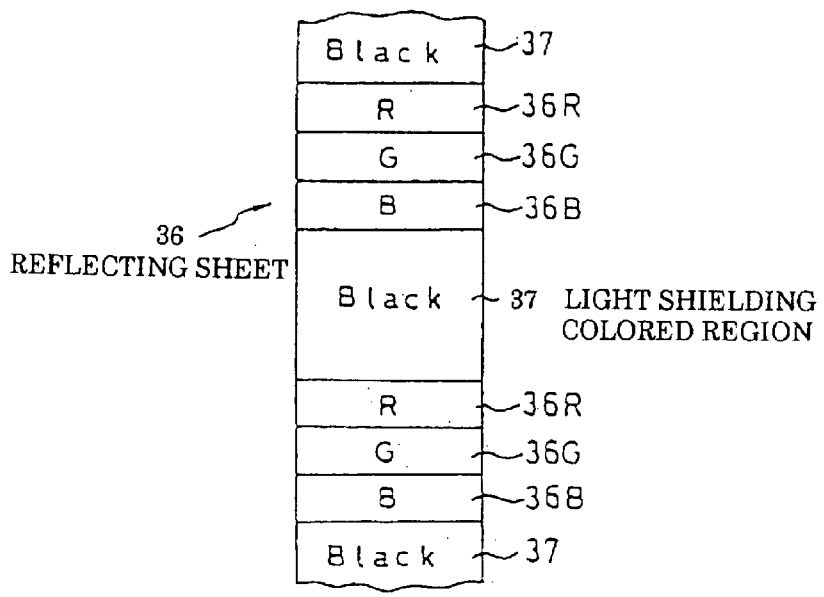
FIG. 8 is an exploded view showing reflecting regions on a reflection sheet in a third preferred embodiment according to the present invention.

Although only one reflecting region for forming the reflected color light corresponds to each of the colors R, G and B in the reflecting sheets 18 and 32 in the above-described preferred embodiments, the present invention is not limited to this. As illustrated in FIG. 8, two or more sets of R, G and B reflecting regions 36R, 36G and 36B and/or a light shielding colored region 37 may be provided on a single reflecting sheet 36.

In this case, the speed of the reflecting sheet 36 can be decreased in proportion to the number of sets in comparison with the above-described reflection type color liquid crystal display device 10.

Furthermore, although the reflecting sheets 18, 32 and 36 are continuously driven by the motor 20C in the above-described preferred embodiments, the present invention is not limited to this. For example, like a picture film, the reflecting sheet may be fed frame by frame per color and light shielding colored region. In this case, the motor 20C should be preferably a pulse motor.

In this manner, when the reflecting regions and/or the light shielding colored region in the reflecting sheet are intermittently driven and rotated, the holding time of each of the regions can be provided, thus remarkably enhancing the visibility of the screen.

EXAMPLES

Detailed descriptions will be given below of Examples 1 to 3 according to the present invention.

Example 1

First of all, a sheet having a reflecting layer made of an aluminum in a thickness of 60 nm was formed with a base made of a PET film having a thickness of 70 $\mu$m by vacuum deposition The resultant sheet was coated with photosensitive substance, which could exhibit adhesiveness by exposure to light, thereby forming a photosensitive layer (in a thickness of 1.5 $\mu$m).

Subsequently, the photosensitive layer was exposed to an ultraviolet ray via a photo mask for a light shielding portion. A super high-pressure mercury-vapor lamp was used as a light source for exposure.

In this manner, a reflecting sheet having reflecting regions of three colors R, G and B was obtained. The width of the reflecting sheet was set to 40 mm, and further, the length of a colored reflecting region was set to 27 mm.

Next, a driver included a motor and a pair of small-sized cylinders consisting of rotary supporters which were fixed to the motor and juxtaposed with each other, and then, the above-described reflecting sheet in the form of an endless belt was wound around the pair of small-sized cylinders, to be thus rotated in a free fashion.

As a liquid crystal display panel was adopted a TFT-LCD having a size of 30 mm×40 mm and a display resolution of 640×480 in compliance with VGA in an OCB display mode. SE7210 (manufactured by Nissan Chemical Industries, Ltd.) was selected as an orientation film material for the LCD, and applied onto the TFT substrate and its opposite substrate, followed by parallel rubbing treatment. A gap between the substrates was set to 6 $\mu$m. Optically compensated films were disposed on both sides of a cell.

As a liquid crystal was adopted LIXON TD-6004XX manufactured by CHISSO CORPORATION, whose display characteristics were measured. The rotating speed of the two cylinders was synchronized with a response time of the liquid crystal by a controller.

As a result, an excellent color displaying could be achieved.

Example 2

The configuration in Example 2 was the same as that in Example 1 except that a light shielding colored region having a length equivalent to that of the reflecting region of one color was formed in the reflecting sheet subsequently to the reflecting regions of the colors R, G and B.

In the same manner as in Example 1, the rotating speed of a cylinder was synchronized with a response time of a liquid crystal, and further, a black displaying period corresponding to the light shielding colored region was provided on the side of the liquid crystal, whose display characteristics were measured. As a result, a so-called color breakup was observed in the case of a moving image.

Example 3

A reflecting sheet in Example 3 was the same as that in Example 2 except that the entire length of a light shielding colored region was set to be equivalent to that of reflecting regions of three colors, that is, it was set to be equivalent to half of the entire length of the reflecting sheet. As a result, no color breakup occurred, and therefore, an excellent color displaying screen could be achieved.

Additionally, no flicker of the light source was observed in any one of Examples 1 to 3. Consequently, it was possible to achieve easy-on-the-eyes displaying of high visibility without any variation in light intensity at the time of a rising-up response and a rising-down response, unlike in the case where a short-persistent light source such as an LED is used.

Figure 9:
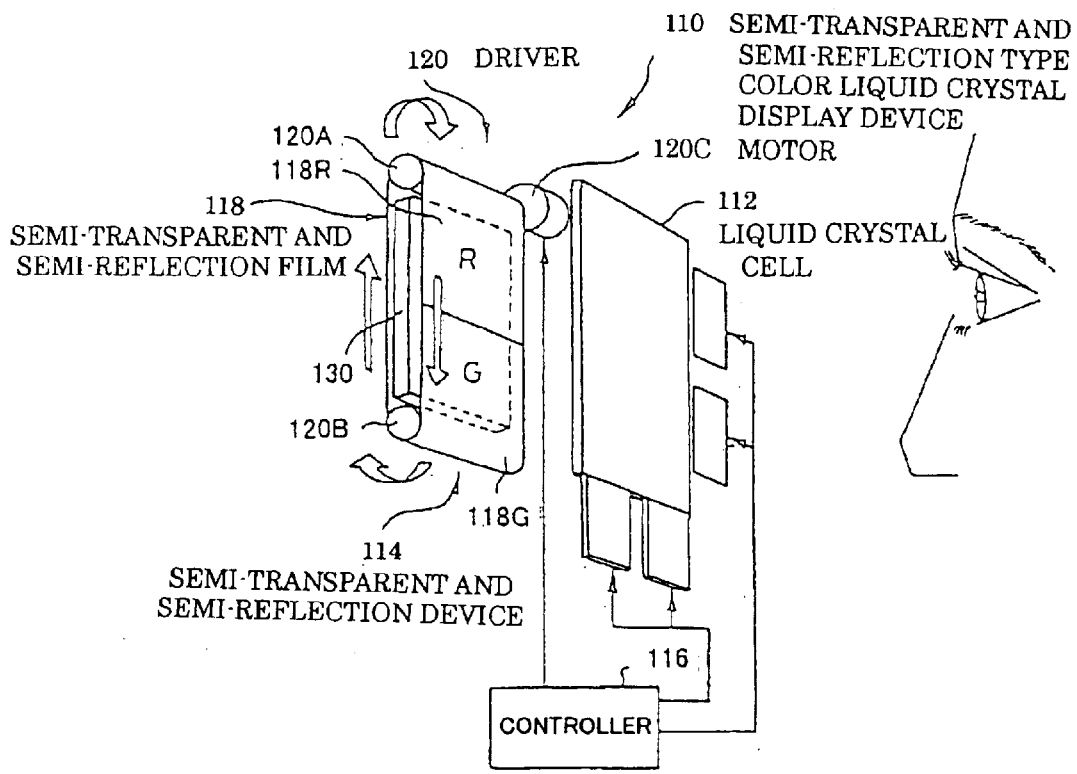
FIG. 9 is a schematically exploded perspective view showing a semi-transparent and semi-reflection type color liquid crystal display device in a fourth preferred embodiment according to the present invention.

Fourth to Seventh Embodiments:
Semi-Transparent and Semi-Reflection Type Color Liquid Crystal Display Device As illustrated in FIG. 9, a semi-transparent and semi-reflection type color liquid crystal display device 110 in a fourth preferred embodiment comprises a liquid crystal cell 112 of a field sequential system in which light transmittances are sequentially controlled in such a manner as to correspond to three colors, i.e., R (red), G (green) and B (blue) at one frame on a screen to be displayed at one and the same pixel, and a semi-transparent and semi-reflection device 114 disposed on the back side of the liquid crystal cell 112 in such a manner as to allow outside light passing through the liquid crystal cell 112 to be incident thereinto.

The liquid crystal cell 112 is adapted to perform color displaying in a field sequential (sequential pixel displaying) system, that is, perform color displaying in a method for mixing colors in time sequence by a controller 116.

Specifically, R, G and B are divided into three fields (i.e., images), which are switched in sequence at a high speed, to be thus synthesized into one color image.

Consequently, although only an image of a single color is displayed at an instant time, the colors are mixed together by the effect of a phenomenon of the persistence of vision in the retina if a field repeating speed is enough high not to recognize a flicker, so that the color image can be recognized.

Light of a single color R, G or B incident from the back side of the liquid crystal cell 112 is formed by the reflection device 114, and then, the respective lights of the colors are allowed to pass, reflected and formed in sequence in accordance with a switching timing by the liquid crystal cell 112 as a light shutter.

Figure 10:
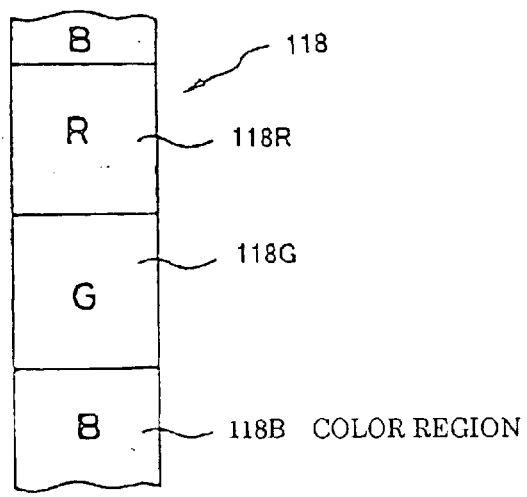
FIG. 10 is an exploded view showing a semi-transparent and semi-reflection film in the semi-transparent and semi-reflection type color liquid crystal display device.

The semi-transparent and semi-reflection device 114 includes an endless belt-like semi-transparent and semi-reflection film 118 (see FIG. 10) divided in coating into three color regions 118R, 118G and 118B in such a manner as to form transparent and reflected light of each of the three colors R, G and B; a driver 120 consisting of a pair of rolls 120A and 120B for winding up and driving the semi-transparent and semi-reflection film 118 and a motor 120C for driving at least one of the rolls; and a light source 130 disposed inside of the pair of rolls 120A and 120B and the semi-transparent and semi-reflection film 118, for irradiating the back surface of the liquid crystal cell 112 with emission light via the semi-transparent and semi-reflection film 118.

Figure 11:
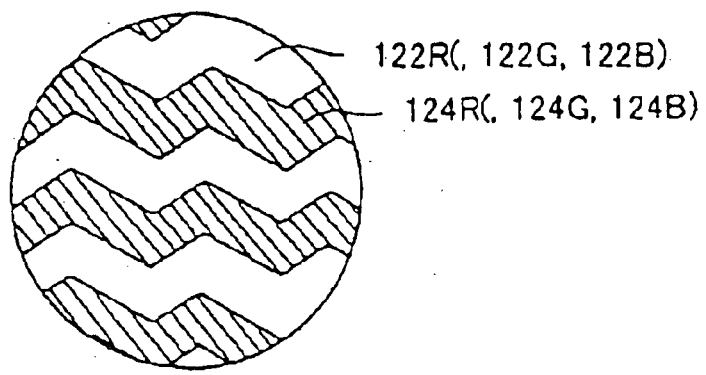
FIG. 11 is a partly enlarged view showing an exploded semi-transparent and semi-reflection film in the semi-transparent and semi-reflection type color liquid crystal display device.

The above-described color region 118R consists of a transparent region 122R and a reflection region 124R, which are alternately arranged in a sequentially moving direction of the above-described semi-transparent and semi-reflection film 118. Each of the transparent region 122R and the reflection region 124R is formed into a zigzag shape having a fixed width. The zigzag extends in a direction perpendicular to the sequentially moving direction of the above-described film 118 (see FIG. 11). Moreover, the angle of the zigzag, i.e., the inclination angle of each of the transparent region 122R and the reflection region 124R is set from 10° to 80° in the sequentially moving direction or in the direction perpendicular to the moving direction.

Similarly, the above-described color regions 118G and 118B consist of transparent regions 122G and 122B and reflection regions 124G and 124B, respectively, which are alternately arranged in the sequentially moving direction of the above-described film 118. Each of the transparent regions 122G and 122B and the reflection regions 124G and 124B is formed into a zigzag shape having a fixed width. The zigzag extends in the direction perpendicular to the moving direction.

The motor 120C is controlled by the controller 116 within the range of the field switching speed of the liquid crystal cell 112 in such a manner that the color regions 118R, 118G and 118B are sequentially positioned on the back side of the liquid crystal cell 112. Field switching in the liquid crystal cell 112 is controlled in synchronism with the switching speed of the color regions 118R, 118G and 118B.

Figure 12:
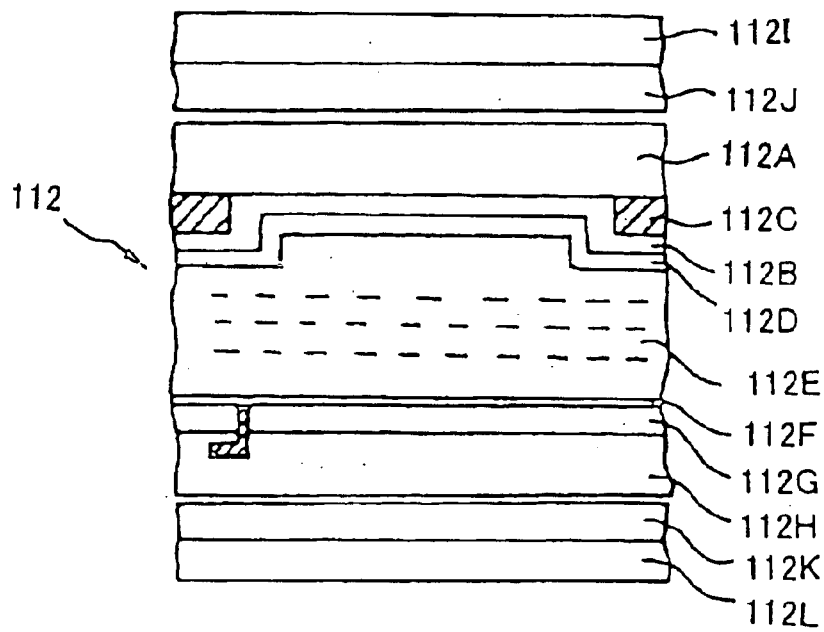
FIG. 12 is an enlarged cross-sectional view showing one pixel in a liquid crystal cell in the semi-transparent and semi-reflection type color liquid crystal display device.

As illustrated partly in enlargement in FIG. 12, the liquid crystal cell 112 is constituted of a transparent substrate 112A on a display side, a transparent common electrode 112B, a black matrix 112C sandwiched between the outer periphery of each of pixels on the transparent common electrode and the transparent substrate 112A on the display side, an orientation film 112D, a liquid crystal layer 112E, another orientation film 112F on an opposite side, for holding the liquid crystal layer 112E between the orientation film 112D and the same, a pixel electrode 112G for supporting the orientation film 112F, a TFT array substrate 112H for supporting the transparent pixel electrode 112G, polarizing plates 112I and 112L and optically compensated films 112J and 112K, in order from the side of an observer.

Incidentally, the liquid crystal cell 112 is not restricted to the arrangement illustrated in FIG. 12, and maybe constituted of other elements by a well-known technique. However, the liquid crystal cell 12 is different from that in a color liquid crystal display in the prior art in that there is no color filter for each color and each of the pixels displays a plurality of colors.

Figure 13:
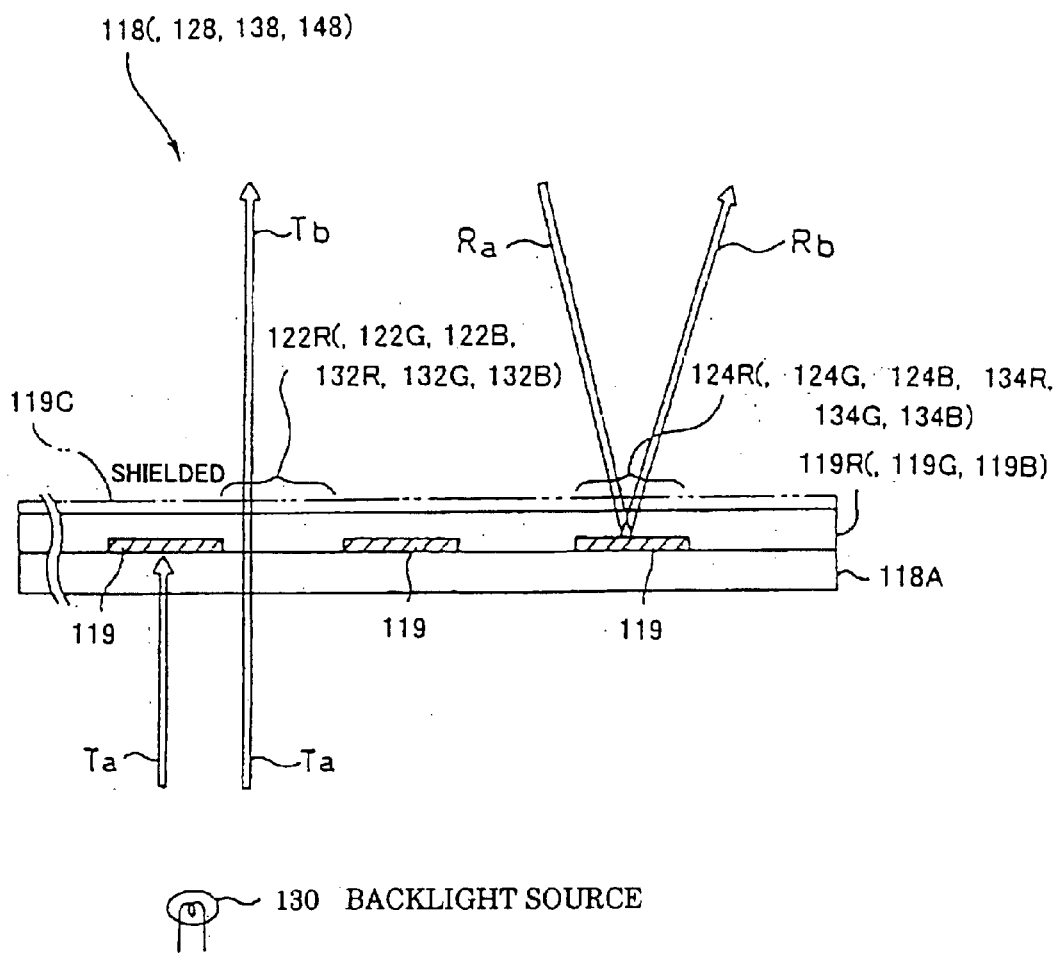
FIG. 13 is a partly enlarged cross-sectional view showing the semi-transparent and semi-reflection film in the semi-transparent and semi-reflection type color liquid crystal display device.

In the cross-sectional structure of the semi-transparent and semi-reflection film 118 in the semi-transparent and semi-reflection device 114, reflecting layers 119 formed into a zigzag shape, as viewed on the plane, are intermittently formed at fixed intervals on a base film 118A such as a resin film, as illustrated in FIG. 13. On the reflecting layers 119 are formed colored layers 119R, 119G and 119B. The intervals between the reflecting layers 119 are embedded with the colored layers 119R, 119G and 119B. The film 118 inclusive of the reflecting layers 119 is formed in a uniform thickness. The regions having the reflecting layers 119 formed thereon serve as the reflecting regions 124R, 124G and 124B; in contrast, the regions having no reflecting layers 119 formed thereon serve as the transparent regions 122R, 122G and 122B.

As the base film 118A is used a transparent, plastic film such as a polyethylene terephtharate (PET) film, a polyester film, a polycarbonate film, a polyacryl film or a polyolefin film. The thickness of the base film 118A is not limited in particular, but it should be preferably from 10 μm to 5 mm.

If the thickness of the base film 118A is equal to or less than 10 μm, the base film 118A is poor in scuff-resistance during continuous rotation (movement); in contrast, if it is equal to or more than 5 mm, the rigidity becomes excessive, thereby preventing smooth rotation, inducing excessive light absorption and reducing light transmittance.

The reflecting layer 119 formed on the base film 118A is formed by physical vapor deposition (abbreviated as PVD) with metal having a high reflectance such as aluminum or silver. The PVD is appropriately selected from ordinary methods for forming a metal thin film, such as vacuum deposition, sputtering and ion plating. Furthermore, the reflecting layer 119 maybe formed in a plurality of layers. Here, a satisfactory reflectance can be achieved if the thickness of the reflecting layer 119 ranges from about 50 nm to 100 nm. Photoetching or the like is used in order to pattern the reflecting layers 119 formed on the entire base film 118A so as to obtain the reflecting regions 124R, 124G and 124B in a zigzag form.

As illustrated in FIG. 13, the colored layers 119R, 119G and 119B are formed on the base film 118A patterned with the reflecting layers 119, so as to allow lights of predetermined colors to pass through and reflect the lights. A specific coloring method is the same as that for a color filter in the prior art, that is, it is a dying method or a dispersing method.

In the case where the above-described light reflecting layer is formed by the PVD such as the deposition method, a protective layer 119C consisting of a coating film made of, for example, an acrylic resin, an epoxy resin, a polyester resin, an urethane resin or an alkyd resin should be preferably formed on the reflecting layers 119 and the colored layers 119R, 119G and 119B in order to prevent any degradation of the reflecting layer, as indicated by a chain double-dashed line in FIG. 13. Such coating should be desirably roll coating, gravure coating or spray coating. Furthermore, a thin film made of inorganic substance such as silicon oxide may be used as the protective layer.

Liquid crystal for use in the liquid crystal layer 112E in the liquid crystal cell 112 should be preferably a high-response liquid crystal such as an optically compensated birefringence (OCB) liquid crystal or a ferroelectric liquid crystal since the response of the liquid crystal need be set from 2 ms to 3 ms or shorter and a high-speed switch transistor made of polysilicon or the like should be desirably used as the TFT, as described later.

Since a field period need be set to 17 ms (1/60 sec.) or shorter so as to prevent any flicker on a screen in the case of the field sequential displaying, the displaying period of each of the color regions 118R, 118G and 118B need be set to 6 ms or shorter.

Incidentally, the moving speed of each of the color regions 118R, 118G and 118B is proportional to the size of the entire screen in the liquid crystal cell 112 and is inversely proportional to the length in the moving direction of each of the color regions 118R, 118G and 118B.

The moving direction of each of the color regions 118R, 118G and 118B in the semi-transparent and semi-reflection film 118 can be any one of vertical, lateral or slantwise directions with respect to the liquid crystal cell (i.e., the screen).

In the semi-transparent and semi-reflection type color liquid crystal display device 110 in the above-described fourth preferred embodiment, the liquid crystal cell 112 is controlled by the controller 116 such that the pixel on the liquid crystal cell 112 displays any color of the corresponding color regions 118R, 118G and 118B when the pixel is positioned in front of any of the color regions 118R, 118G and 118B in synchronism with the rotation of the color regions 118R, 118G and 118B in the semi-transparent and semi-reflection film 118 in the semi-transparent and semi-reflection device 114 at a predetermined speed in a fixed direction by the driver 120.

Therefore, the color regions 118R, 118G and 118B are moved in sequence at an interval of 17 ms or shorter, as described above, and accordingly, R, G and B are controlled in sequence to be displayed on the liquid crystal cell 112, so that the light emitted from the backlight source 130 passes through any one of the transparent regions 122R, 122G and 122B in the color regions 118R, 118G and 118B, to be turned into the colored light, and then, passes through the liquid crystal cell 112. The outside light incident through the surface of the liquid crystal cell 112 is reflected on any of the reflecting regions 124R, 124G and 124B in the color regions 118R, 118G and 118B after passing through the liquid crystal cell 112, to be thus turned into a colored light, which then passes through the liquid crystal cell 112 again, thereby displaying the colors in sequence.

More in details, as illustrated in FIG. 13, when light Ta emitted from the backlight source 130 is incident into any one of the transparent regions 122R, 122G and 122B in the semi-transparent and semi-reflection film 118, it is turned into the colored light when it passes through the colored layers 119R, 119G and 119B. Thereafter, the timing at which the colored light passes through the liquid crystal cell 112 is controlled by the controller 116 in synchronism with the driver 120, to be thus emitted as a transparent colored light Tb in desired color displaying.

In the meantime, when outside light Ra incident from the surroundings at the same time is incident into and reflected on any one of the reflecting regions 124R, 124G and 124B in the film 118, it becomes a colored light when it passes through the colored layers 119R, 119G and 119B. Thereafter, the light is emitted as a reflecting colored light Rb in desired color displaying by the liquid crystal cell 112, the driver 120 and the controller 116 in the same manner as described above.

In this manner, the transparent colored light Tb and the reflecting colored light Rb can be emitted from the liquid crystal cell 112 irrespective of the contrast in the ambient environment.

On the side of an observer, the lights of the colors R, G and B at one and the same pixel during a field period of 1/60 sec. or shorter are displayed in sequence, so that the colors are timewise mixed together by the effect of the phenomenon of the persistence of vision in the retina, and consequently, the color image can be recognized.

In particular, the use of the backlight source 130 for forming the light of a single color in the semi-transparent and semi-reflection type color liquid crystal display device 110 in this preferred embodiment can achieve the clear and bright screen displaying with reduced power consumption, and consequently, is suitably used in portable electronic equipment or the like which is driven by a battery.

Table 1 below shows the lightness of an image when a character is drawn in a white background. Here, values are relative to each other, and are absolute numbers when a value in a background in the prior art is regarded as a reference value 1.

TABLE 1

|  | Character | Background | Contrast |
|---|---|---|---|
| A. Prior Art | 0.1 | 1.0 | 10 |
| B. Present Embodiment | 0.1 | 1.4 | 14 |

As shown in Table 1, the appropriate use of the transparent colored light from the backlight source 130 or the reflecting colored light by the outside light can enhance the lightness in the background 1.4 times the prior art. Consequently, even if the lightness of the character remains conventional, the contrast can become 1.4 times, and therefore, the image is easy to be seen.

Incidentally, it is preferable that the ratio of the total area of the transparent regions 122R, 122G and 122B to the total area of the reflecting regions 124R, 124G and 124B in the semi-transparent and semi-reflection film 118 should range from 2:1 to 1:9. In the case where the total area of the transparent regions 122R, 122G and 122B exceeds the double value of the total area of the reflecting regions 124R, 124G and 124B, the utilizing rate of the outside light is reduced, and accordingly, the bright screen cannot be displayed unless the reduced utilizing rate depends upon the light source 130. In contrast, in the case where the ratio is less than 1/10, the light emitted from the light source 130 is shielded even if the outside is dark, and accordingly, an unclear and dark screen is merely displayed in addition to the waste of the electric power of the light source 130.

The size of a minimum unit of the zigzag form consisting of the transparent and reflecting regions in the semi-transparent and semi-reflection film 118 is set smaller than the size of one pixel in the liquid crystal cell 112. Thus, a screen contrast flicker phenomenon as viewed from the observer can be suppressed without enhancing the accuracy of the control of the liquid crystal cell 112 when the semi-transparent and semi-reflection film 118 is moved.

Furthermore, the transparent and reflecting regions in the zigzag form may be formed in a mosaic or honeycomb shape. The same function can be produced without enhancing the accuracy of driving control of the semi-transparent and semi-reflection film 118 as long as the size of a minimum unit of the shape is smaller than the size of one pixel in the liquid crystal cell 112.

Figure 14:
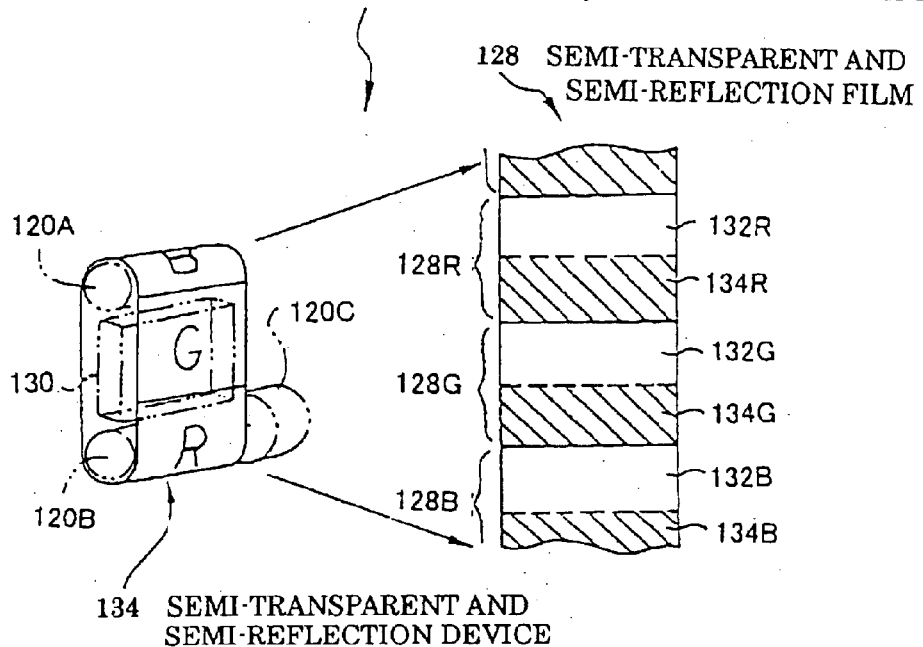
FIG. 14 is a perspective view, inclusive of an exploded view, showing a semi-transparent and semi-reflection film in a semi-transparent and semi-reflection type color liquid crystal display device in a fifth preferred embodiment according to the present invention.

Next, explanation will be made on a semi-transparent and semi-reflection type color liquid crystal display device 140 in a fifth preferred embodiment according to the present invention, as illustrated in FIG. 14.

This semi-transparent and semi-reflection type color liquid crystal display device 140 (the entire configuration of which will be omitted in the illustration) comprises a semi-transparent and semi-reflection device 134 including a semi-transparent and semi-reflection film 128 having transparent and reflection regions having patterns different from those of the above-described semi-transparent and semi-reflection film 118 in addition to a liquid crystal cell 112, not shown, a controller 116, not shown, a driver 120, not shown, and a backlight source 130, which are the same as those in the semi-transparent and semi-reflection type color liquid crystal display device 110 illustrated in FIG. 9.

In the semi-transparent and semi-reflection film 128, there are provided color regions 128R, 128G and 128B of three colors R, G and B which are the same as the above-described color regions 118R, 118G and 118B.

As illustrated in FIG. 14, the above-described color region 128R consists of a transparent region 132R and a reflection region 134R, which are arranged in such a manner that the color region 128R is bisected into a former half and a latter half in the moving direction of the film 128.

Similarly, the above-described color region 128G consists of a transparent region 132G and a reflection region 134G, which are arranged in such a manner that the color region 128G is bisected into a former half and a latter half in the moving direction of the film 128, and further, the above-described color region 128B consists of a transparent region 132B and a reflection region 134B, which are arranged in such a manner that the color region 128B is bisected into a former half and a latter half in the moving direction of the film 128.

The cross-sectional structure of the semi-transparent and semi-reflection film 128 in the semi-transparent and semi-reflection device 134 is schematically similar to that of the semi-transparent and semi-reflection film 118 illustrated in FIG. 13. A different point of the former from the latter is that reflecting layers 119 intermittently formed at fixed intervals on a base film 118A are formed into not a zigzag shape but a rectangular shape, as viewed on the plane, and are arranged in the color regions 128R, 128G and 128B as the reflection regions 134R, 134G and 134B, respectively.

The motor 120C is controlled by the controller 116 within the range of the field switching speed of the liquid crystal cell 112 in such a manner that the color regions 128R, 128G and 128B are sequentially positioned on the back side of the liquid crystal cell 112. Field switching in the liquid crystal cell 112 is controlled in synchronism with the switching speed of the color regions 128R, 128G and 128B.

The semi-transparent and semi-reflection film 128 is designed such that the transparent region 132R and the reflection region 134R in the color region 128R, the transparent region 132G and the reflection region 134G in the color region 128G and the transparent region 132B and the reflection region 134B in the color region 128B appear in this order with respect to the liquid crystal cell 112 by the motor 120C.

In this manner, similarly to the fourth embodiment, the transparent colored light and the reflection colored light can be emitted from the liquid crystal cell 112 irrespective of the contrast in the ambient environment.

The control conditions of the field period capable of preventing any flicker on the screen in the case of the field sequential displaying, the displaying period of each of the color regions 128R, 128G and 128B and the like are the same as those in the fourth embodiment.

The moving direction of each of the color regions 128R, 128G and 128B in the semi-transparent and semi-reflection film 128 must be a direction transverse to the color regions with respect to the liquid crystal cell (i.e., the screen).

In the fifth embodiment according to the present invention, the reflection regions 134R, 134G and 134B are formed into a block having a simply rectangular shape, and each of the reflection regions 134R, 134G and 134B occupies only one portion in each of the color regions 128R, 128G and 128B. Consequently, high precision is not required even in the process of patterning the reflection layer 119 in comparison with the case of the zigzag shape, thus fabricating the film 128 at a reduced cost.

Furthermore, explanation will be made on a semi-transparent and semi-reflection type color liquid crystal display device 170 in a sixth preferred embodiment according to the present invention.

This semi-transparent and semi-reflection type color liquid crystal display device 170 (the entire configuration of which will be omitted in the illustration) comprises a semi-transparent and semi-reflection device 154, not shown, including a semi-transparent and semi-reflection film 138 having transparent and reflection regions having patterns different from those of the above-described semi-transparent and semi-reflection film 128 and color regions in addition to a liquid crystal cell 112, not shown, a controller 116, not shown, a driver 120, not shown, and a backlight source 130, not shown, which are the same as those in the semi-transparent and semi-reflection type color liquid crystal display device 110 illustrated in FIG. 9.

Figure 15:
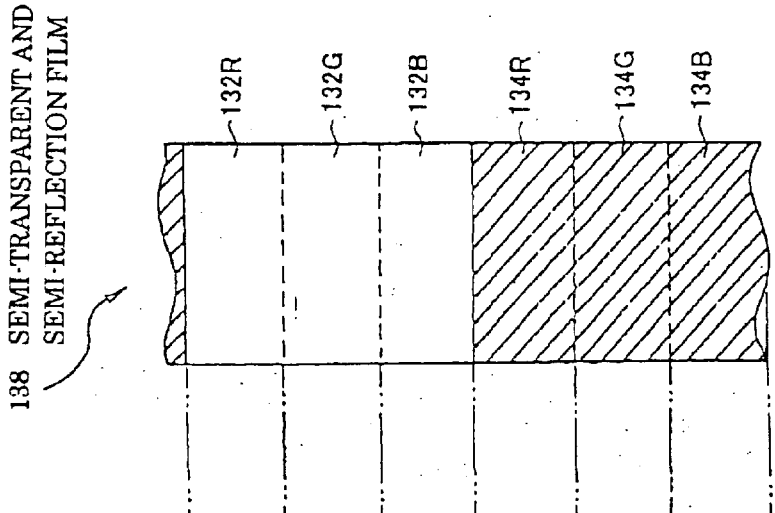
FIG. 15 is an exploded view showing a semi-transparent and semi-reflection film in a sixth preferred embodiment according to the present invention.

In the semi-transparent and semi-reflection film 138, color regions 132R, 132G and 132B and 134R, 134G and 134B of three colors R, G and B, which are the same as the above-described color regions 128R, 128G and 128B, are provided at the transparent regions and the reflection regions, respectively (see FIG. 15).

Moreover, the semi-transparent and semi-reflection film 138 is driven by a motor 120C such that the transparent region 132R, the transparent region 132G, the transparent region 132B, the reflection region 134R, the reflection region 134G and the reflection region 134B appear in this order in the transparent region and the reflection region with respect to the liquid crystal cell 112.

As illustrated in FIG. 15, in the situation in which the ambient environment is dark, the light source 130 is lighted, so that the transparent regions 132R, 132G and 132B are used as color regions while the reflection regions 134R, 134G and 134B are used as light shielding colored regions. In contrast, in the situation in which the ambient environment is bright, the light source 130 is extinguished, so that the transparent regions 132R, 132G and 132B function as light shielding colored regions while the reflection regions 134R, 134G and 134B irradiated with the outside light are used as colored regions.

In this manner, the transparent colored light and the reflection colored light are appropriately selected and emitted from the liquid crystal cell 112 according to the contrast in the ambient environment.

Although there is no variation in the control condition relating to the field period capable of preventing any flicker on the screen in the case of the field sequential displaying, the displaying period of each of the regions 132R, 132G, 132B, 134R, 134G and 134B need to be set to 3 ms or shorter since the transparent and reflection regions function as the light shielding colored regions so as to mutually compensate with each other, as described above.

Similarly to the fifth embodiment according to the present invention, the moving direction of each of the color regions 132R, 132G and 132B or 134R, 134G and 134B must be a transverse direction, i.e., a vertical direction with respect to the liquid crystal cell (i.e., the screen).

In the meantime, the displaying is performed in black in the liquid crystal cell 112 by the controller 116 by regarding a period corresponding to the light shielding colored region as a blanking period.

Figure 16:
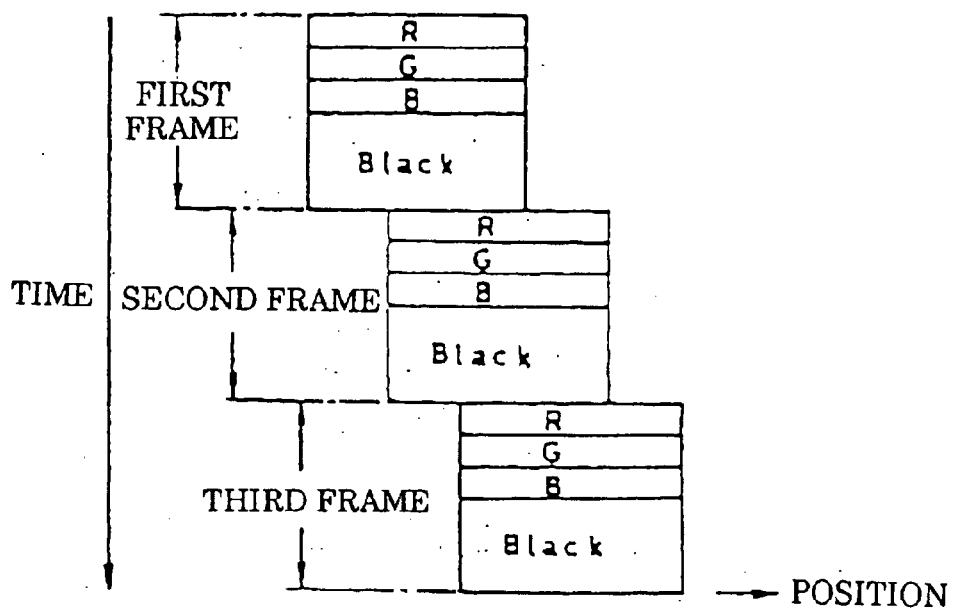
FIG. 16 is a schematic view illustrating the state of color displaying in the semi-transparent and semi-reflection type color liquid crystal display device based on the relationship between a horizontal position on a screen and a time axial direction.

In this manner, the transparent regions 132R, 132G and 132B and the light shielding colored region 134R, 134G and 134B in this order are sequentially rotated and moved with the light source 130 lighted in the dark ambient environment, and further, the reflection regions 134R, 134G and 134B and the light shielding colored regions 132R, 132G and 132B in this order are sequentially rotated and moved with the light source 130 extinguished in the bright ambient environment in the semi-transparent and semi-reflection film 138 in this semi-transparent and semi-reflection type color liquid crystal display device, so that the displaying in black is always performed after the displaying in the three colors, that is, in the sequence of R, G, B, Black, R, G, B and Black in a first frame, a second frame and a third frame in displaying a moving image which moves, for example, rightward in FIG. 16, as schematically illustrated in FIG. 16.

Figure 17:
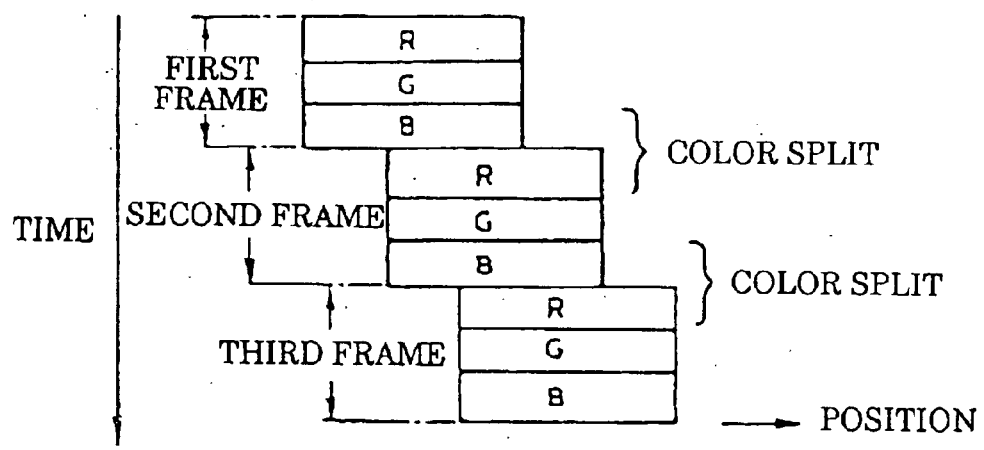
FIG. 17 is a schematic view, similar to FIG. 16, in the case where there is no light shielding colored region in the semi-transparent and semi-reflection film.

This can prevent a so-called color breakup. That is to say, in the case where there is provided no light shielding colored region, and further, where there is no blanking period for the displaying in black on the side of the liquid crystal cell 112, the last color B in each of the frames and the first color R of a next frame are mixed by the effect of the phenomenon of the persistence of vision in the retina of an observer when a moving image is displayed in the same manner as described above, thereby inducing occurrence of a so-called color breakup, as illustrated in FIG. 17. However, in this semi-transparent and semi-reflection type color liquid crystal display device 170 in the sixth embodiment, the light shielding colored region is displayed in black after the regions 32B, 32G and 32R are displayed in the colors R, G and B, thus preventing any occurrence of the color breakup.

Figure 18:
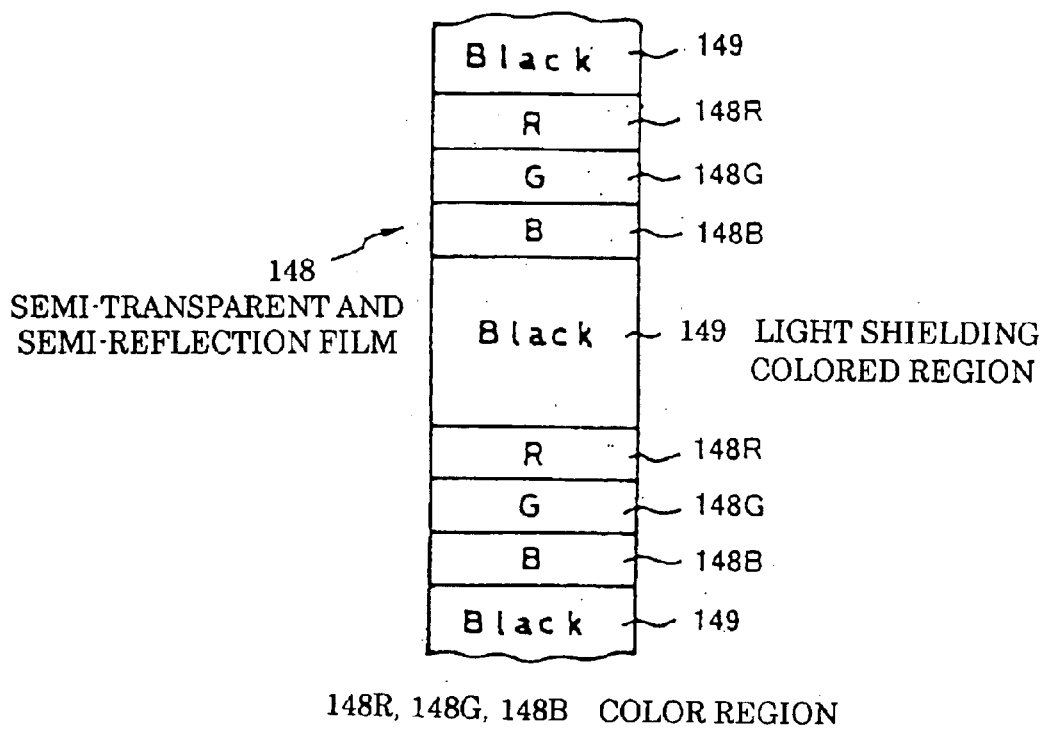
FIG. 18 is an exploded view showing a semi-transparent and semi-reflection film in a seventh preferred embodiment according to the present invention.

Although in the above-described embodiments, the semi-transparent and semi-reflection regions for forming the semi-transparent and semi-reflection color lights in any one of the semi-transparent and semi-reflection films 118, 128 and 138 are provided one-to-one correspondence with respect to the colors R, G and B, the present invention is not limited to the above-described embodiments. Like in a seventh embodiment illustrated in FIG. 18, two or more sets of semi-transparent and semi-reflection regions 148R, 148G and 148B for R, G and B and/or a light shielding colored region 149 may be provided in a single semi-transparent and semi-reflection film 148.

In this case, the driving speed of the semi-transparent and semi-reflection film 148 can be decreased in proportion to the number of sets in comparison with any one of the above-described semi-transparent and semi-reflection type color liquid crystal display devices 110, 140 and 170.

Moreover, although in the above-described embodiments, any one of the semi-transparent and semi-reflection films 118, 128 and 138 is continuously driven by the motor 120C, the present invention is not limited to the above-described embodiments. For example, like a motion picture film, the reflection film may be fed frame by frame per color and light shielding colored region. In this case, the motor 120C should be preferably a pulse motor.

In this manner, when the reflecting regions and/or the light shielding colored region in the semi-transparent and semi-reflection film are intermittently driven and rotated, the holding time of each of the regions can be provided, thus remarkably enhancing the visibility of the screen.

EXAMPLE

Example 4

A detailed description will be given below of Example 4 according to the present invention.

First of all, a film having a reflecting layer made of an aluminum in a thickness of 60 nm was formed with a base made of a PET film having a thickness of 70 $\mu$m by vacuum deposition. The resultant film was coated with photosensitive substance, which could exhibit adhesiveness by exposure to light, thereby forming a photosensitive layer (in a thickness of 1.5 $\mu$m).

Subsequently, the photosensitive layer was exposed to an ultraviolet ray via a photo mask for a light shielding portion. A super high-pressure mercury-vapor lamp was used as a light source for exposure.

In this manner, a semi-transparent and semi-reflection film having color regions of three colors R, G and B was obtained. The width of the semi-transparent and semi-reflection film was set to 40 mm, and further, the length of a colored semi-transparent and semi-reflection region was set to 27 mm.

Next, a driver included a motor and a pair of small-sized cylinders consisting of rotary supporters which were fixed to the motor and juxtaposed with each other, and then, the above-described semi-transparent and semi-reflection film in the form of an endless belt was wound around the pair of small-sized cylinders, to be thus rotated in a free fashion.

As a liquid crystal display panel was adopted a TFT-LCD having a size of 30 mm×40 mm and a display resolution of 640×480 in compliance with VGA in an OCB display mode. SE7210 (manufactured by Nissan Chemical Industries, Ltd.) was selected as an orientation film material for the LCD, and applied onto the TFT substrate and its opposite substrate, followed by parallel rubbing treatment. A gap between the substrates was set to 6 $\mu$m. Optically compensated films were disposed on both sides of a cell.

As a liquid crystal was adopted LIXON TD-6004XX manufactured by CHISSO CORPORATION, whose display characteristics were measured. The rotating speed of the two cylinders was synchronized with a response time of the liquid crystal by a controller.

As a result, an excellent color displaying could be achieved.

No flicker of the light source was observed during the image displaying in any one of the fourth to seventh embodiments. Consequently, it was possible to achieve easy-on-the-eyes displaying of high visibility without any variation in light intensity at the time of a rising-up response and a rising-down response, unlike in the case where a short-persistent light source such as an LED is used.

Since the present invention is configured as described above, it is possible to provide the reflection type color liquid crystal display device and the semi-transparent and semi-reflection type color liquid crystal display device of the field sequential displaying system, which can be used in portable electronic equipment driven by a battery, thus producing an excellent effect of the clear image displaying.

What is claimed is:

1. A reflection type color liquid crystal display device comprising:
    a liquid crystal cell of a field sequential system, in which light transmittances are sequentially controlled per pixel in such a manner as to correspond to the number of two or more colors at one frame on a screen to be displayed; and
    a reflection device disposed at a position at which light passing through the liquid crystal cell is incident, the reflection device including:
        a reflection sheet provided with two or more reflecting regions colored in color corresponding to that of the frame; and
        a driver for driving the reflection sheet in such a manner as to sequentially move the two or more reflecting regions to a position at which the incident light is selectively reflected toward the liquid crystal cell in synchronism with the control of the order of colors in the pixel in the liquid crystal cell.

2. A reflection type color liquid crystal display device according to claim 1, wherein the reflection sheet is formed into the shape of an endless belt, the two or more reflecting regions are arranged at an obverse of the reflection sheet in a longitudinal direction, and the driver is provided with rolls for winding up and supporting the endless belt-like reflection sheet and a motor for rotating and driving the rolls.

3. A reflection type color liquid crystal display device according to claim 1, wherein the liquid crystal cell is controlled by setting a blanking period at which the color is not displayed between the frames on the screen to be displayed, at least one set of reflecting regions is disposed in the reflection sheet as a set of the two or more colors, a belt-like low reflectance region is arranged in a direction perpendicular to the sequentially moving direction at a rear end or a fore end in the sequentially moving direction in each set of the reflecting regions, and the low reflectance region is moved in synchronism with the blanking period in the liquid crystal cell.

4. A reflection type color liquid crystal display device according to claim 3, wherein the low reflectance region is colored in black.

5. A reflection type color liquid crystal display device according to claim 3 or claim 4, wherein the length of the low reflectance region in the moving direction is 50% to 100% of the length of one set of reflecting regions in the moving direction.

6. A semi-transparent and semi-reflection type color liquid crystal display device comprising:
   a liquid crystal cell of a field sequential system, in which light transmittances are sequentially controlled per pixel in such a manner as to correspond to the number of two or more colors at one frame on a screen to be displayed; and
   a semi-transparent and semi-reflection device disposed at a position at which outside light passing through the liquid crystal cell is incident, the semi-transparent and semi-reflection device including:
      a semi-transparent and semi-reflection film including two or more color regions colored in color corresponding to the display color of the frame, the color region being provided with a transparent region and a reflecting region;
      a light source located at a position at which the liquid crystal cell is irradiated with light from the back side while holding the semi-transparent and semi-reflection film between the liquid crystal cell and the same; and
      a driver for driving the semi-transparent and semi-reflection film in such a manner as to sequentially move to a position at which the two or more color regions allow the light emitted from the light source to selectively pass in the direction of the liquid crystal cell and the outside light is reflected toward the liquid crystal cell in synchronism with a control of an order of colors in the pixel in the liquid crystal cell.

7. A semi-transparent and semi-reflection type color liquid crystal display device according to claim 6, wherein the semi-transparent and semi-reflection film is formed into the shape of an endless belt, the two or more color regions are arranged at an obverse of the reflection sheet in a longitudinal direction of the film, and the driver is provided with rolls for winding up and supporting the endless belt-like semi-transparent and semi-reflection film and a motor for rotating and driving the rolls.

8. A semi-transparent and semi-reflection type color liquid crystal display device according to claim 6, wherein at least one set of color regions is disposed in the semi-transparent and semi-reflection film as a set of the two or more color regions, and the transparent and reflecting regions in each of the color regions are alternately arranged in a plurality of stripes having an inclination angle with respect to the sequentially moving direction.

9. A semi-transparent and semi-reflection type color liquid crystal display device according to claim 8, wherein the transparent and reflecting regions alternately arranged in the striped manner extend in a zigzag fashion in a direction perpendicular to the sequentially moving direction.

10. A semi-transparent and semi-reflection type color liquid crystal display device according to claim 9, wherein the transparent and reflecting regions are formed in a zigzag fashion, at least one of turning points of the zigzag being superimposed on each of the pixels in the liquid crystal cell.

11. A semi-transparent and semi-reflection type color liquid crystal display device according to claim 8, wherein the inclination angle is from 10° to 80°.

12. A semi-transparent and semi-reflection type color liquid crystal display device according to claim 6, wherein at least one set of color regions is disposed in the semi-transparent and semi-reflection film as a set of the two or more color regions, and the transparent and reflecting regions in each of the color regions are arranged separately forward and rearward in a moving direction in the color region.

13. A semi-transparent and semi-reflection type color liquid crystal display device according to claim 6, wherein the area ratio of the transparent region to the reflecting region ranges from 2:1 to 1:9.

* * * * *